(12) United States Patent
Ooshiro

(10) Patent No.: US 12,159,757 B2
(45) Date of Patent: Dec. 3, 2024

(54) METHOD OF MANUFACTURING A COMPOSITE ELECTRODE AND APPARATUS FOR MANUFACTURING A COMPOSITE ELECTRODE

(71) Applicant: KABUSHIKI KAISHA TOSHIBA, Tokyo (JP)

(72) Inventor: Kenichi Ooshiro, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 181 days.

(21) Appl. No.: 17/644,160

(22) Filed: Dec. 14, 2021

(65) Prior Publication Data
US 2022/0270829 A1 Aug. 25, 2022

(30) Foreign Application Priority Data
Feb. 25, 2021 (JP) .................................. 2021-028775

(51) Int. Cl.
*H01G 9/045* (2006.01)
*D01D 5/00* (2006.01)
(Continued)

(52) U.S. Cl.
CPC .......... *H01G 9/045* (2013.01); *D01D 5/0015* (2013.01); *D01D 5/0061* (2013.01); *H01G 9/008* (2013.01); *H01G 9/10* (2013.01); *D10B 2401/16* (2013.01)

(58) Field of Classification Search
CPC .......... H01G 9/045; H01G 9/008; H01G 9/10; H01G 9/0029; H01G 9/042; D01D 5/0015; D01D 5/0061; D10B 2401/16; Y02E 60/10; H01B 5/16; H01B 13/00; H01B 17/62; H01B 19/04; H01M 4/04; H01M 4/0419;
(Continued)

(56) References Cited

U.S. PATENT DOCUMENTS
2010/0233523 A1   9/2010 Jo et al.
2010/0323052 A1  12/2010 Orr et al.
(Continued)

FOREIGN PATENT DOCUMENTS
CA  2846922 A1 * 9/2014 ............ C01B 33/02
CN  102144058 B    7/2012
(Continued)

OTHER PUBLICATIONS
Korean Office Action issued May 27, 2024 in Korean Patent Application No. 10-2021-0188270 (with unedited computer-generated English Translation), 21 pages.
(Continued)

*Primary Examiner* — Dion R. Ferguson
(74) *Attorney, Agent, or Firm* — Oblon, McClelland, Maier & Neustadt, L.L.P.

(57) ABSTRACT

According to one embodiment, provided is a method of manufacturing a composite electrode including a substrate having a belt shape and an insulating fiber film disposed on the substrate. The method includes applying a primer solution onto the substrate, and ejecting an electrified material liquid in a direction parallel to principal surfaces of the substrate intersecting with side surfaces of the substrate to deposit the electrified material liquid onto the substrate to form the insulating fiber film on the principal surfaces of the substrate.

11 Claims, 11 Drawing Sheets

(51) Int. Cl.
  *H01G 9/008* (2006.01)
  *H01G 9/10* (2006.01)

(58) Field of Classification Search
  CPC .. H01M 4/043; H01M 4/0471; H01M 10/052; H01M 2220/30
  See application file for complete search history.

(56) References Cited

U.S. PATENT DOCUMENTS

| | | |
|---|---|---|
| 2011/0177395 A1 | 7/2011 | Kamisasa |
| 2013/0004748 A1 | 1/2013 | Heiskanen et al. |
| 2021/0043905 A1 | 2/2021 | Kishi |
| 2022/0270829 A1* | 8/2022 | Ooshiro .................. H01G 9/10 |

FOREIGN PATENT DOCUMENTS

| | | | |
|---|---|---|---|
| CN | 102811860 A | | 12/2012 |
| JP | 6-246210 A | | 9/1994 |
| JP | 2000-77254 A | | 3/2000 |
| JP | 2010-500717 A | | 1/2010 |
| JP | 2011207149 A | * | 10/2011 |
| JP | 2013-80828 A | | 5/2013 |
| JP | 2013-251347 A | | 12/2013 |
| JP | 2014-201849 | | 10/2014 |
| JP | 2016-162680 | | 9/2016 |
| JP | 2021-027285 | | 2/2021 |
| JP | 2021-27285 A | | 2/2021 |
| KR | 10-2018-0004021 A | | 1/2018 |
| KR | 20180025827 A | * | 3/2018 |
| KR | 20210117915 A | * | 9/2021 |
| WO | WO 2017/134852 A1 | | 8/2017 |

OTHER PUBLICATIONS

Office Action mailed Sep. 3, 2024 in Japanese Application No. 2021-028775 filed Feb. 25, 2021 (w/machine translation).

* cited by examiner

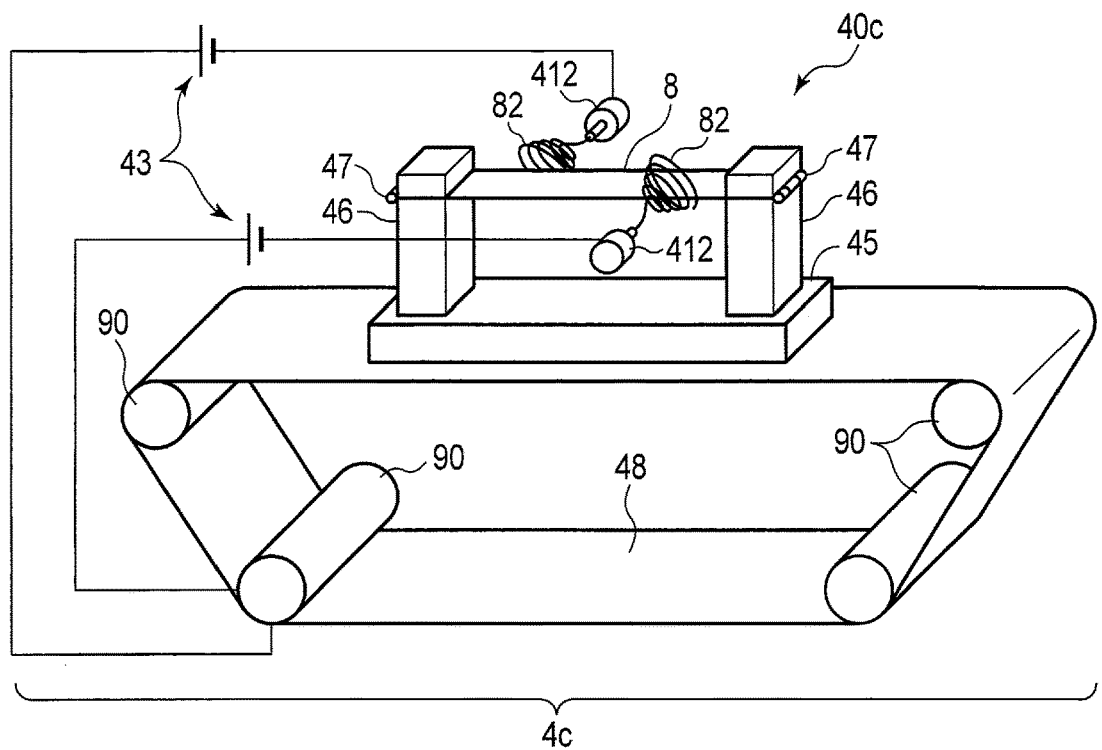
F I G. 5
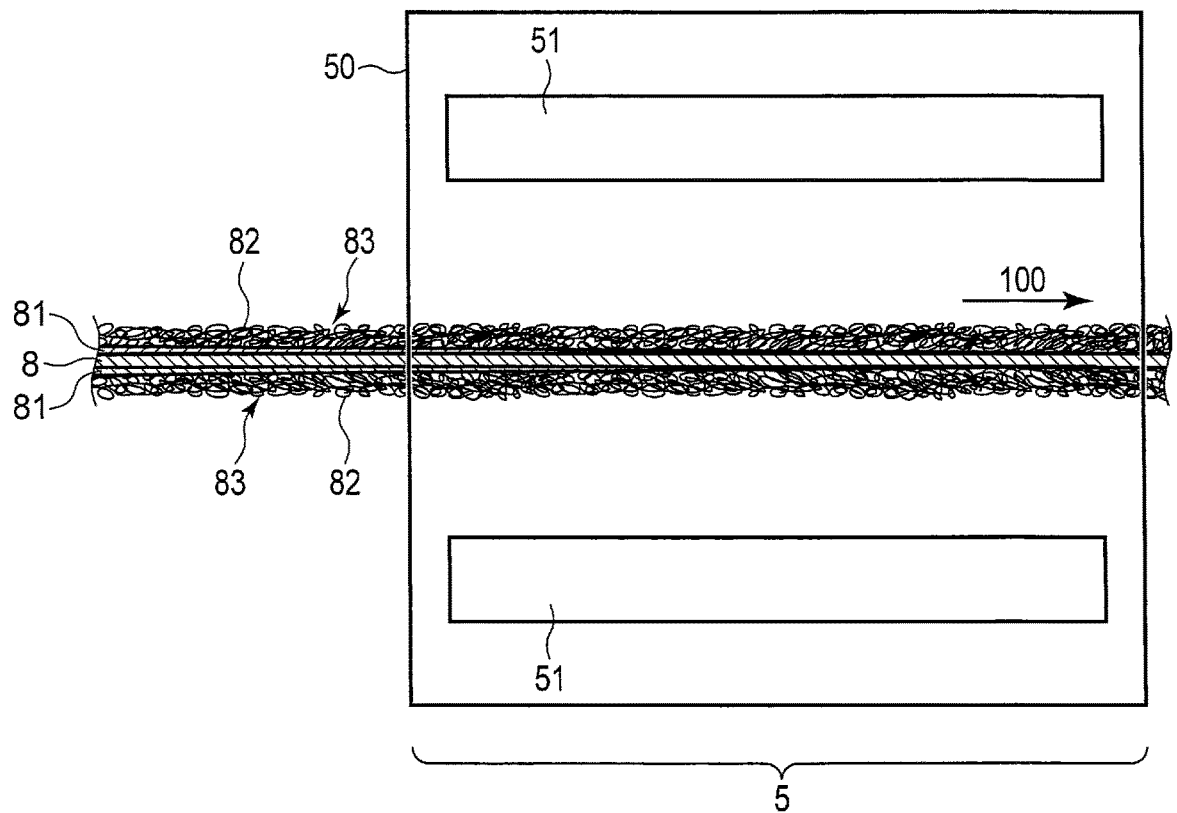
F I G. 6

METHOD OF MANUFACTURING A COMPOSITE ELECTRODE AND APPARATUS FOR MANUFACTURING A COMPOSITE ELECTRODE

This application is based upon and claims the benefit of priority from prior Japanese Patent Application No. 2021-028775, filed Feb. 25, 2021, the entire contents of which are incorporated herein by reference.

FIELD

Embodiments described herein relate generally to a method of manufacturing a composite electrode and an apparatus for manufacturing a composite electrode.

BACKGROUND

Known are electrospinning apparatuses that deposit microfibers on a surface of a collector or a substrate to form a fiber film by an electrospinning method (sometimes referred to as an "electric charge induction spinning method" or the like). An exemplar electrospinning apparatus is provided with an electrospinning head, which includes a head main body and a nozzle that projects from the outer peripheral surface of the head main body. The electrospinning head is configured so that a storage hollow capable of storing a material liquid is formed inside the head main body. A flow path (nozzle flow path) communicating with the storage hollow is formed inside the nozzle, and an ejection port of the flow path is formed at an end of the nozzle projecting from the head main body. A voltage is applied between the nozzle (electrospinning head) and the collector or substrate to thereby eject the material liquid from the ejection port of the flow path toward the surface of the collector or substrate, whereby fibers are deposited onto the surface of the collector or substrate.

As an example of application of the fiber film formed in such a manner, known is a separation film that is required to provide electrical insulation, such as a separator used in electric storage devices such as a lithium ion secondary battery or an electric double layer capacitor. As portable electronic devices and the like prevail, downsizing of electric storage devices is desired. In the electrospinning method, fibers ejected toward the surface of the collector or substrate are deposited over a wide range of area of a certain size. Thus, further processing has been necessary or waste of materials has arisen when applying a film obtained by the electrospinning method to a small-sized electric storage device. For such reasons, improvements in productivity and material efficiency are in demand for formation of a small-sized film.

BRIEF DESCRIPTION OF THE DRAWINGS

FIG. 5 is a perspective view schematically showing another example of an electrospinning device included in the apparatus for manufacturing a composite electrode according to the embodiment;

FIG. 6 is a schematic sectional view showing an example of drying that may be included in a method for manufacturing a composite electrode according to an embodiment;

DETAILED DESCRIPTION

According to one embodiment, provided is a method of manufacturing a composite electrode including a substrate having a belt shape and an insulating fiber film disposed on the substrate. The method includes applying a primer solution onto the substrate, and ejecting an electrified material liquid in a direction parallel to principal surfaces of the substrate intersecting with side surfaces of the substrate to deposit the electrified material liquid onto the substrate to form the insulating fiber film on the principal surfaces of the substrate.

According to another embodiment, provided is an apparatus for manufacturing a composite electrode. The apparatus includes a conveyer configured to convey a substrate having a belt shape along a conveying path, an applier configured to apply a primer solution onto the substrate, and an electrospinning equipment disposed so that a flow direction of a flow path communicating with an ejection port configured to eject a material liquid is parallel to principal surfaces of the substrate intersecting with side surfaces of the substrate. The applier applies the primer solution onto the substrate at a first position on the conveying path. The electrospinning equipment is disposed at a second position on the conveying path downstream relative to the first position.

The manufacturing method according to the embodiment is a method for manufacturing a composite electrode that includes a substrate having a belt shape and an insulating fiber film disposed on the substrate. The manufacturing method includes applying a primer solution onto a substrate having a belt shape, and forming an insulating fiber film on principal surfaces of the substrate. The insulating fiber film is formed on the principal surfaces of the substrate by ejecting an electrified material liquid in a direction parallel to the principal surfaces, which intersect with side surfaces of the substrate, to deposit the electrified material liquid onto the substrate.

The manufacturing apparatus according to the embodiment is a manufacturing apparatus for the above composite electrode, and manufactures the composite oxide by the above manufacturing method. The manufacturing apparatus includes a conveyer, an applier, and an electrospinning equipment. The conveyer is configured to convey a substrate having a belt shape along a conveying path. The applier applies a primer solution onto the substrate at a first position on the conveying path. The electrospinning equipment is disposed at a second position downstream of the first position on the conveying path. The electrospinning equipment is disposed so that a flow direction of a flow path, which is in communication with an ejection port configured to eject a material liquid, is parallel to principal surfaces of the substrate intersecting with side surfaces thereof.

Hereinafter, embodiments will be described with reference to the drawings.

Figure 1:
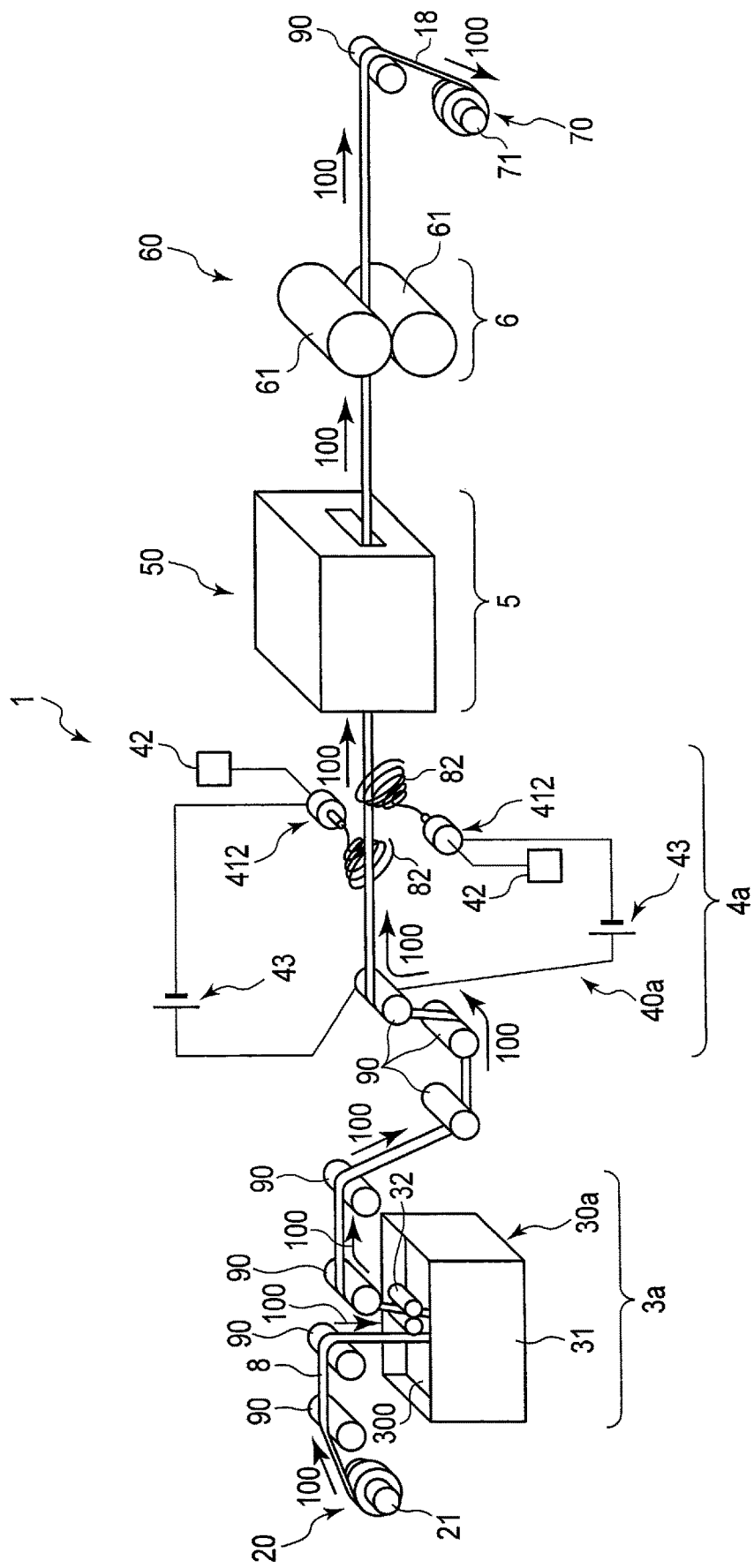
FIG. 1 is a perspective view schematically showing an example of an apparatus for manufacturing a composite electrode according to an embodiment.

FIG. 1 is a perspective view schematically showing an example of an apparatus for manufacturing a composite electrode according to an embodiment. A manufacturing apparatus 1 shown as an example in FIG. 1 includes an unwinder 20, an applier 30a, an electrospinning device 40a including electrospinning nozzles 412 as an electrospinning equipment, a drying furnace 50, a press 60, a roll-up device 70, and a plurality of guide rollers 90. In the manufacturing apparatus 1, a convey a substrate 8 along a conveying path 100 is configured from the unwinder 20, the roll-up device 70, and the plurality of guide rollers 90.

The unwinder 20 includes a reel 21. The substrate 8 is wound around the reel 21 in a roll. At the unwinder 20, a driving member (not shown) such as an electric motor is driven so that the reel 21 is rotated. Thereby, the substrate 8 wound around the reel 21 is unwound. The unwound substrate 8 is then fed to the conveying path 100.

The roll-up device 70 includes a reel 71. In the roll-up device 70, a driving member (not shown) such as an electric motor is driven so that the reel 71 is rotated. Thereby, the substrate 8 conveyed along the conveying path 100 is rolled-up by the reel 71 into a roll.

In the manufacturing apparatus 1, the reel 71 is rotated at the same time as the reel 21 is rotated, so that the substrate 8 is conveyed from the unwinder 20 to the roll-up device 70 along the conveying path 100. The number and arrangement of guide rollers 90 that guide the substrate 8 from the unwinder 20 to the roll-up device 70 are not limited to those depicted. Further, the number and arrangement of turns and fold-backs along the conveying path 100 from the unwinder 20 to the roll-up device 70 are not limited to those depicted.

In FIG. 1, one example of an apparatus of a roll-to-roll format where the substrate 8 fed out from the unwinder 20 continuously passes through each of the components of the manufacturing apparatus 1 along the conveying path 100 and finally rolled-up by the roll-up device 70; however, the embodiments (both the manufacturing method and the manufacturing apparatus) are not limited to a continuous format like the one shown. For example, the formation of the insulating fiber film onto the substrate 8 may be performed in batches, as described later in detail.

The substrate 8 has a belt shape. The belt shape of the substrate 8 has a short-side width of, for example, 2 mm to 6 mm. The substrate 8 is preferably an electrically conductive foil. The substrate 8 is more preferably an electrically conductive foil having an oxide coating, which functions as a dielectric layer, chemically formed on its surface. The substrate 8 is, for example, an aluminum foil coated with an aluminum oxide coating. The substrate may have a thickness of, for example, 50 μm to 200 μm.

The applier 30a is disposed at a first position 3a on the conveying path 100 of the substrate 8 downstream relative to the unwinder 20. The applier 30a applies a primer solution 300 onto the substrate 8.

Figure 2:
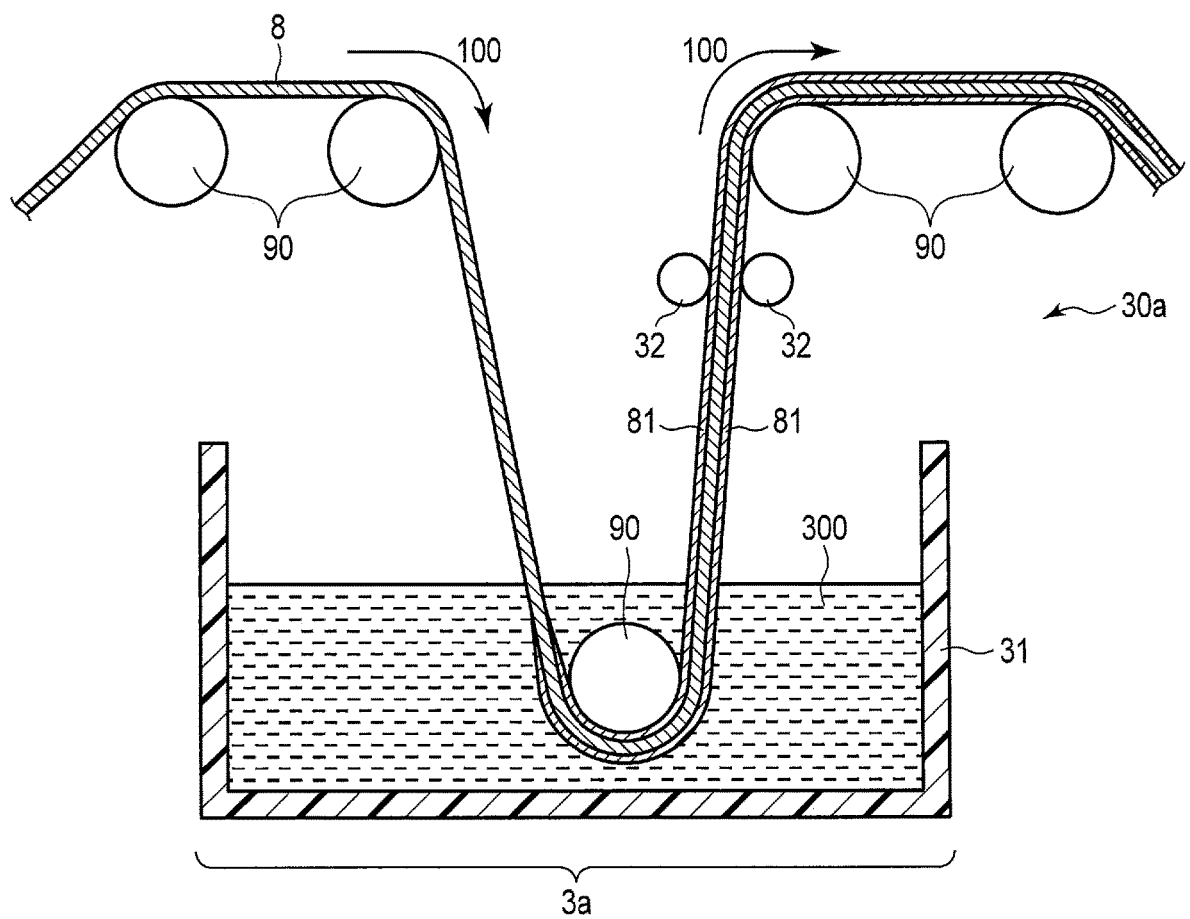
FIG. 2 is a schematic sectional view showing an example of an applier included in the apparatus for manufacturing a composite electrode according to the embodiment.

In the depicted example, shown is an aspect in which the primer solution 300 is applied onto the substrate 8 at the first position 3a by a dip method. FIG. 2 more specifically shows a primer treatment of the substrate 8 by such a dip coat method.

FIG. 2 is a schematic sectional view providing more detailed illustration of this aspect of applying the primer solution 300 onto the substrate 8 at the first position 3a. The applier 30a disposed at the first position 3a includes a container 31. The container 31 defines a space through which the substrate 8 passes, and is capable of storing the primer solution 300. In the example shown, the applier 30a further includes a pair of metering rolls 32. At the first position 3a, the guide rollers 90 are arranged so that the substrate 8 will be drawn out of the primer solution 300 after once being passed through the inside of the primer solution 300. The guide rollers 90 are also arranged so that the substrate 8 drawn out of the primer solution 300 passes between the metering rolls 32.

When the substrate 8 is dipped into the primer solution 300 at the first position 3a partway in being conveyed along the conveying path 100, the primer solution 300 is applied onto the surface of the substrate 8, resulting in formation of a primer coating 81 that coats the substrate 8. The substrate 8 coated with the primer coating 81 passes between the pair of metering rolls 32, whereby excess primer solution 300 is removed and a uniform primer coating 81 is formed.

The primer solution 300 includes, for example, at least one selected from the group consisting of ethylene glycol and γ-butyrolactone. An organic solvent generally adopted as a solvent of an electrolyte solution used in a condenser or a capacitor may also be used as the primer solution 300. Examples of such an organic solvent include ethylene glycol monomethyl ether, glycerin, and N-ethylformamide.

The container 31 of the applier 30a is made of a material resistant to the primer solution 300, such as a synthetic resin material.

Figure 3:
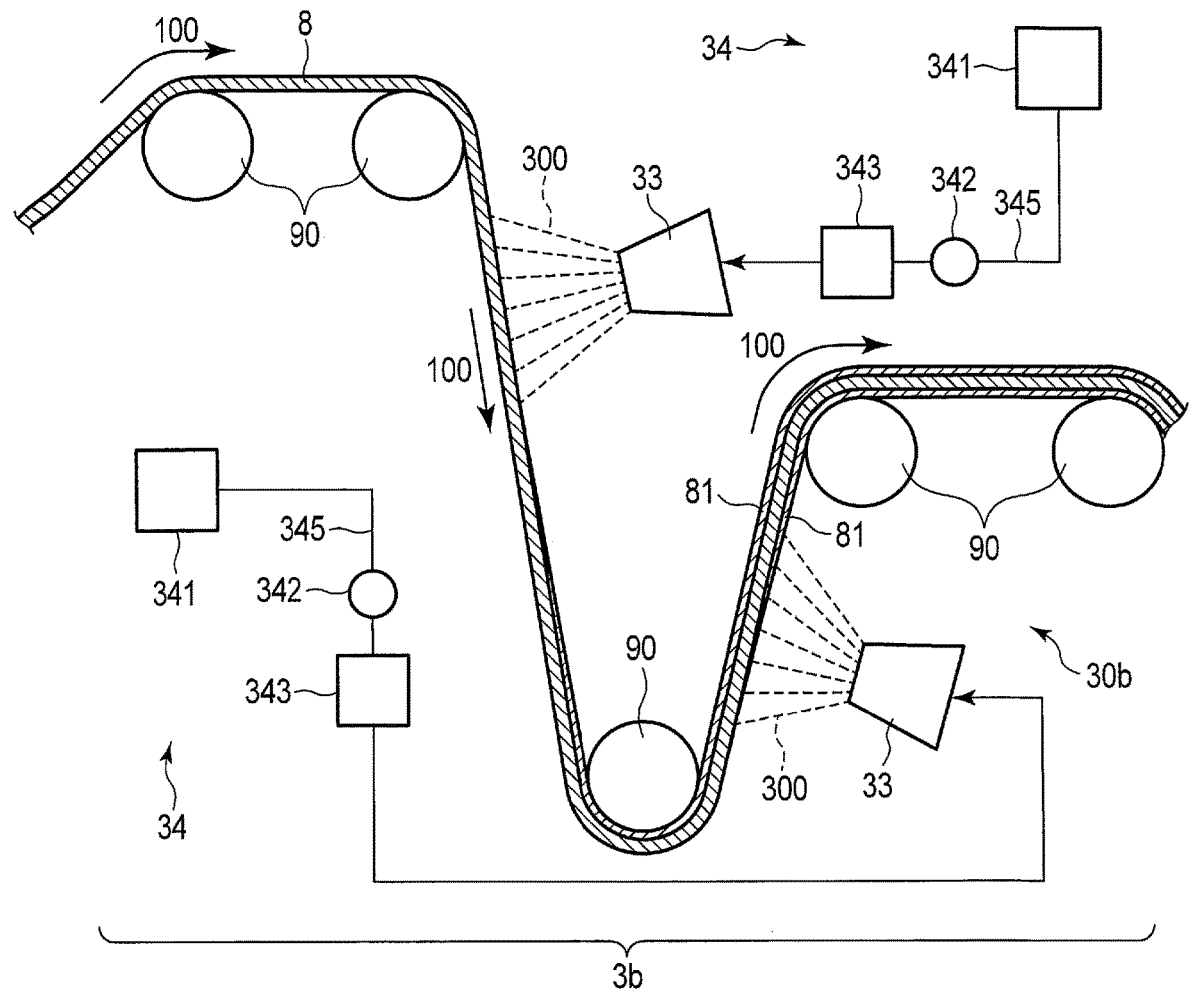
FIG. 3 is a schematic sectional view showing another example of an applier included in the apparatus for manufacturing a composite electrode according to the embodiment.

The manufacturing method and the manufacturing apparatus according to the embodiments may also adopt application of the primer solution 300 onto the substrate 8 by a spray method, instead of the dip method described above. FIG. 3 shows such a primer treatment of the substrate 8 by a spray coat method.

FIG. 3 is a schematic sectional view illustrating application of the primer solution 300 onto the substrate 8 in the aspect of adopting a spray method. In addition to the guide rollers 90 defining the conveying path 100 of the substrate 8, an applier 30b, which includes sprayers provided with spray nozzles 33 configured to spray the primer solution 300 toward the substrate 8 and primer supply sources 34, is arranged at a first position 3b.

The primer solution 300 is supplied from the primer supply source 34 to the spray nozzle 33. The primer supply source 34 includes a primer solution storage tank 341, a primer supply drive 342, a primer supply adjuster 343, and a primer supply pipe 345. Each of the primer solution storage tank 341, the primer supply drive 342, the primer supply adjuster 343, and the primer supply pipe 345 is made of a material resistant to the primer solution 300. The sprayer may further include a controller (not shown) which controls driving of the primer supply drive 342 and the operation of the primer supply adjuster 343.

The primer solution 300 is sprayed at the first position 3b from the spray nozzles 33 onto both of the front and back principal surfaces of the substrate 8 conveyed along the conveying path 100, whereby the principal surfaces of the substrate 8 are coated with the primer coating 81. In the example shown, the spray nozzles 33 are arranged so that one of the principal surfaces of the substrate 8 will be coated with the primer coating 81 and thereafter the other of the principal surfaces will be coated with the primer coating 81; however, the arrangement of the spray nozzles 33 is not limited to the example depicted. For example, the spray nozzles 33 may be arranged so that both faces of the substrate 8 will be simultaneously exposed to a mist of the primer solution 300.

The number of spray nozzles 33 is not particularly limited and may be set discretionarily as long as at least one spray nozzle 33 is provided for each side of the substrate 8. Alternatively, there may be provided a mechanism configured to change the positional relationship between the spray nozzle(s) 33 and the substrate 8, so that the primer solution 300 will be sprayed to one of the principal surfaces of the substrate 8 using at least one spray nozzle 33 and thereafter the primer solution 300 will be sprayed to the other of the principal surfaces of the substrate 8 using the at least one spray nozzle 33. In addition, a desirable configuration is one in which the primer solution 300 is sprayed onto the entire surface including not only the principal surfaces but also the side surfaces of the substrate 8.

The spray nozzle 33 is preferably made of a material resistant to the primer solution 300, such as a stainless steel.

The sprayer is not limited to the depicted configuration including the spray nozzle(s) 33 and such, as long as the sprayer has a configuration for spraying the primer solution 300 onto the substrate 8.

The method of applying the primer solution 300 to the substrate 8 is not limited to the dip method or the spray method described above.

On the conveying path 100 of the substrate 8, the electrospinning device 40a is provided at a second position 4a on the downstream side of the first position 3a (or the first position 3b) at which the primer solution 300 is applied to the substrate 8. The electrospinning device 40a is provided with electrospinning nozzles 412 arranged so that ejection ports face side surfaces of the substrate 8. At the second position 4a, a material liquid of an insulating fiber film of the composite electrode is ejected from the electrospinning nozzles 412 toward side surfaces of the substrate 8 in an electrified state, and is deposited onto the substrate 8. By ejecting the electrified material liquid from the ejection ports of the electrospinning nozzles arranged to face side surfaces of the substrate 8 and depositing the liquid onto the substrate 8, insulating fiber films are formed on the principal surfaces of the substrate 8.

Figure 4:
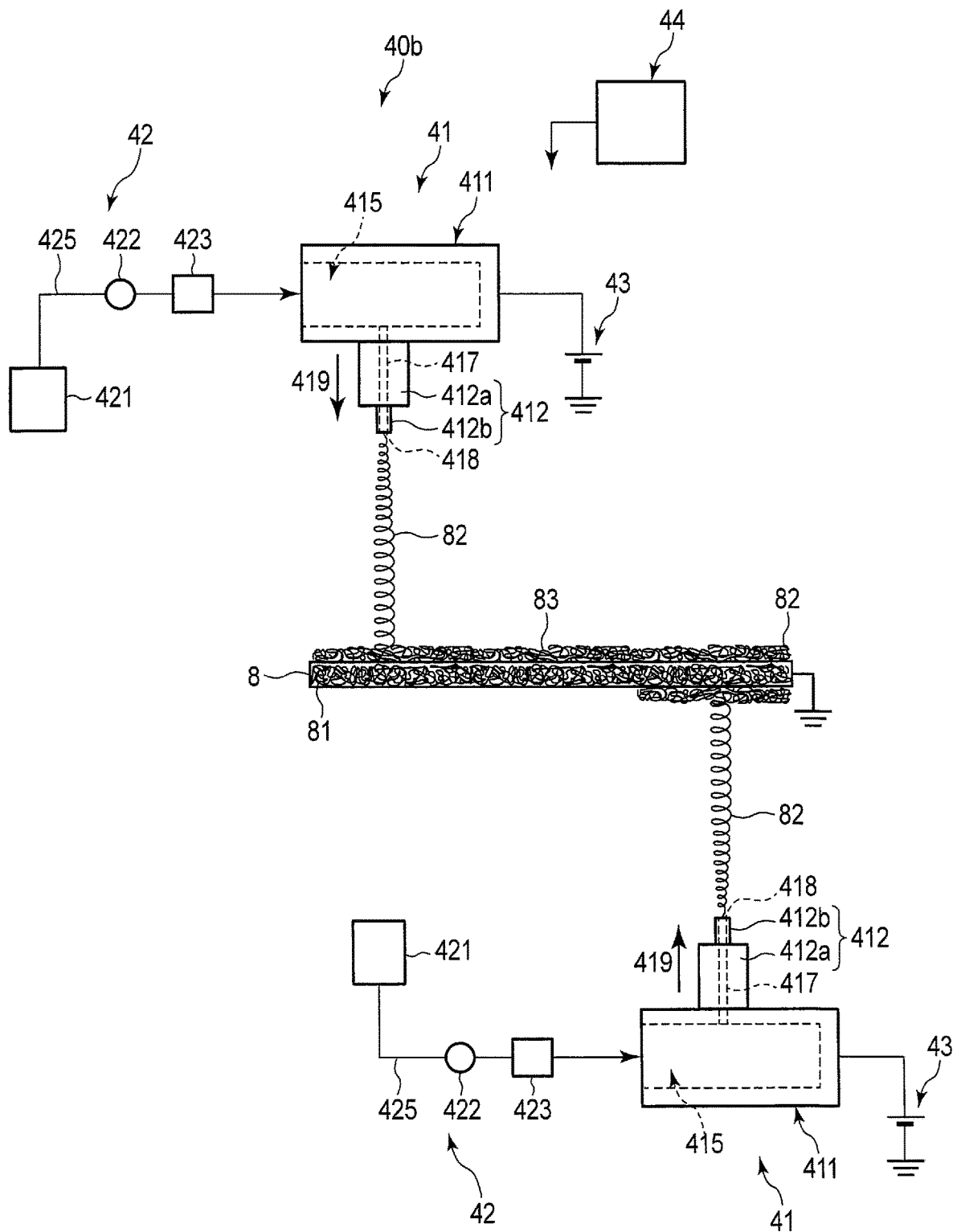
FIG. 4 is a partially transparent view schematically showing an example of an electrospinning device included in the apparatus for manufacturing a composite electrode according to the embodiment.

Formation of an insulating fiber film by the electrospinning method will be described in detail with reference to FIG. 4. FIG. 4 is a partially transparent view schematically showing an example of the electrospinning device disposed at the second position. In regard to the substrate 8, FIG. 4 shows a principal surface thereof.

An electrospinning device 40b shown in FIG. 4 includes electrospinning heads 41 and material liquid supply sources (suppliers) 42 as electrospinning equipment, and further includes power supplies 43 and a controller 44.

The electrospinning heads 41 include a head main body 411 and an electrospinning nozzle 412. The electrospinning nozzle 412 is provided on the outer surface of the head main body 411. Each of the head main body 411 and the electrospinning nozzle 412 is made of an electrically conductive material.

The number of electrospinning nozzles 412 is not particularly limited and may be set discretionarily as long as at least one electrospinning nozzle 412 is provided. Each of the head main body 411 and the electrospinning nozzle 412 is preferably made of a material resistant to a material liquid (to be described later), such as a stainless steel.

A storage hollow 415 is formed inside the head main body 411. The same number of flow paths (nozzle flow paths) 417 as the number of electrospinning nozzles 412 is formed in the electrospinning head 41, and a respective flow path 417 is formed inside each electrospinning nozzle 412. An end of each flow path 417 communicates with the storage hollow 415, and extends from the storage hollow 415 toward the outside of the head main body 411. An ejection port 418 is formed at the end of each flow path 417 opposite to the storage hollow 415, and each of the flow paths 417 is open to the outside at the ejection port 418. A respective ejection port 418 corresponding to each flow path 417 is formed at a distal end of each electrospinning nozzle 412 protruding from the head main body 411.

The electrospinning nozzle 412 may be, for example, a needle-type nozzle. In the example shown in the figure, the electrospinning nozzles 412 include a nozzle base 412a and a needle part 412b. In the electrospinning nozzle 412, the nozzle base 412a is connected to the head main body 411 and forms a base of the protrusion from the head main body 411. Moreover, in the electrospinning nozzle 412, the needle part 412b further protrudes from the nozzle base 412a toward the outer periphery of the electrospinning head 41 and forms an end protruding from the head main body 411. The ejection port 418 is formed at a distal end of the needle part 412b. The outer diameter of the needle part 412b is smaller than that of the nozzle base 412a. The shape of the electrospinning nozzle 412 is not limited to the example shown in the figure.

The material liquid supply sources 42 include a material liquid storage 421, a material liquid supply drive 422, a material liquid supply adjuster 423, and a material liquid supply pipe 425. Each of the material liquid storage 421, the material liquid supply drive 422, the material liquid supply adjuster 423, and the material liquid supply pipe 425 is resistant to the material liquid; in one example, each of the material liquid storage 421 and the material liquid supply pipe 425 is made of an insulating material such as a fluorine resin.

The material liquid storage 421 is, for example, a tank configured to store material liquid. The material liquid is a solution of a polymer material dissolved in a solvent. The polymer included in the material liquid and the solvent for dissolving the polymer are determined as appropriate in accordance with the material of the insulating fiber film formed on the substrate 8, and the like.

The polymer material is not particularly limited but may be changed as appropriate in accordance with the material of the insulating fiber film to be formed. In one example, at least one selected from the group consisting of polyamide and polyamide imide may be used as the polymer material. Other examples of the polymer material include polypropylene, polyethylene, polystyrene, polyethylene terephthalate, polyvinyl chloride, polycarbonate, nylon, and aramid.

Any solvent may be used for the material liquid as long as the solvent can dissolve the polymer material. The solvent may be changed as appropriate in accordance with the polymer material to be dissolved therein. Examples of the solvent include water, methanol, ethanol, isopropyl alcohol, acetone, benzene, toluene, N-methyl-2-pyrolidone (NMP), and dimethylacetamide (DMAc).

The material liquid supply pipe 425 connects the material liquid storage 421 with the head main body 411 of the electrospinning head 41. A flow path of the material liquid is formed inside the material liquid supply pipe 425. The material liquid supply pipe 425 is connected to the head main body 411, whereby the storage hollow 415 communicates with the interior of the material liquid supply pipe 425.

When the material liquid supply drive 422 is driven, the material liquid supply drive 422 supplies the material liquid from the material liquid storage 421 to the storage hollow 415 of the head main body 411 through the material liquid supply pipe 425. In one example, the material liquid supply drive 422 is a pump. In another example, the material liquid supply drive 422 supplies gas to the material liquid storage 421 to thereby deliver the material liquid from the material liquid storage 421 to the storage hollow 415 by pressure. The storage hollow 415 can store the material liquid supplied through the material liquid supply pipe 425.

The material liquid supply adjuster 423 adjusts the amount of flow, pressure, etc., of the material liquid supplied to the electrospinning head 41. In one example, the material liquid supply adjuster 423 includes a control valve capable of controlling the amount of flow, pressure, etc., of the material liquid. In this case, the material liquid supply adjuster 423 adjusts the amount of flow, pressure, etc., of the material liquid as appropriate based on the viscosity of the material liquid, the structure of the electrospinning nozzle 412, and the like. In one example, the material liquid supply adjuster 423 is capable of switching between supplying and halting the supply of the material liquid from the material liquid storage 421 to the electrospinning head 41. In this case, the material liquid supply adjuster 423 is, for example, a switching valve.

The material liquid supply drive 422 and the material liquid supply adjuster 423 need not necessarily be provided. In one example, the material liquid storage 421 is provided vertically above the head main body 411, so that the material liquid is supplied from the material liquid storage 421 to the electrospinning head 41 utilizing gravity. In this case, operations such as switching between supplying and halting the supply of the material liquid can be performed by adjusting the height difference between the head main body 411 and the material liquid storage 421.

In the embodiment, the electrospinning heads 41 that the electrospinning device 40b includes as electrospinning equipment configured to eject a material of the insulating fiber film from the ejection port thereof are not limited to the structure shown in the figure. Other than such electrospinning heads 41 as included in the electrospinning device 40b shown in FIG. 4 and provided with one or more electrospinning nozzles 412, the electrospinning device may include, as an electrospinning equipment, for example, an electrospinning nozzle to which a material is directly supplied from the material liquid supply source 42, as in the case of the electrospinning device 40a shown in FIG. 1, or a nozzle-less electrospinning head (no specific example shown) which does not include an electrospinning nozzle but includes material liquid flow path(s) and ejection port(s) at locations other than a nozzle.

The power supply 43 is capable of applying a voltage to the electrospinning head 41. Through an application of a voltage to the electrospinning head 41, a voltage of a predetermined polarity is applied to each of the electrospinning nozzles 412 via the head main body 411. When a plurality of electrospinning nozzles 412 are provided, a voltage of the same polarity is applied to each of the electrospinning nozzles 412. Through an application of a voltage to the electrospinning head 41 by the power supply 43 as described above, and a supply of the material liquid to the electrospinning head 41 by the material liquid supply adjuster 423, the material liquid is electrified in the same polarity as that of the electrospinning nozzles 412 (electrospinning head 41).

In one example, a terminal (not shown) electrically connected to each of the electrospinning nozzles 412 may be provided, and the power supply 43 may apply a voltage to each of the electrospinning nozzles 412 through the terminal. In this case, the head main body 411 need not be made of an electrically conductive material. The polarity of the voltage applied to each of the electrospinning nozzles 412 may be positive or negative. In the examples shown in the respective figures, the power supply 43 is a direct current power source, and applies a positive voltage to each of the electrospinning nozzles 412.

In the example shown in FIG. 4, the substrate 8 is grounded. Thus, the voltage to ground for the substrate 8 is either 0 V or approximately 0 V in the state where a positive voltage is applied to each of the electrospinning nozzles 412. In another example, the substrate 8 is not grounded. For example, a voltage of the polarity opposite to the polarity of the voltage applied to each of the electrospinning nozzles 412 is applied to the guide rollers 90 provided at the second position 4a by either the power supply 43 or a power supply different from the power supply 43, as in the case of the electrospinning device 40a shown in FIG. 1. Through an application of a voltage to the guide rollers 90 made of an electrically conductive material, a voltage can be applied indirectly to the substrate 8.

The electrospinning nozzles 412 are arranged so that the ejection ports 418 face side surfaces on the long side of the substrate 8. Herein, the side surfaces facing the ejection ports 418 refers to edges along the long side of the belt-shape of the substrate 8. Namely, the side surfaces of the substrate 8 as used herein refers to surfaces intersecting with the principal surfaces of the substrate 8. In other words, the side surfaces of the substrate 8 are surfaces along the thickness direction of the substrate 8. Namely, the electrospinning equipment (electrospinning nozzles 412) are arranged so that flow directions 419 of the flow paths 417 are parallel to the principal surfaces of the substrate 8. In one example, the diameter of the ejection port 418 is from 200 μm to 500 μm.

Through application of voltage to the electrospinning head 41 by the power supply 43 in the state where the material liquid has been supplied to the electrospinning head 41 by the material liquid supply source 42, the material liquid is electrified in the same polarity as the electrospinning head 41. Alternatively, through application of voltage to the electrospinning head 41 followed by supply of the material liquid to the electrospinning head 41, the material liquid is electrified in the same polarity as the electrospinning head 41. Electrifying the material liquid in the same polarity as the electrospinning head 41 causes a potential difference between the material liquid of the electrospinning head 41 (electrospinning nozzle 412) and the substrate 8. The potential difference between the electrospinning head 41 (electrospinning nozzle 412) and the substrate 8 causes the material liquid to be ejected toward the substrate 8. Through ejection of the material liquid from the ejection port 418 of each of the electrospinning nozzles 412 toward the substrate 8, fibers 82 are deposited onto the surfaces of the substrate 8, and insulating fiber films 83 are formed by the deposited fibers 82. Namely, the insulating fiber films 83 are formed by the electrospinning method (sometimes referred to as an "electric charge induction spinning method").

The voltage applied between the electrospinning head 41 and the substrate 8, that is, the potential difference between the substrate 8 and each of the electrospinning nozzles 412, is adjusted as appropriate in accordance with a type of polymer contained in the material liquid, a distance from the respective electrospinning nozzles 412 to the substrate 8, and the like. In one example, a direct-current voltage of 10 kV to 100 kV is applied between the substrate 8 and each of the electrospinning nozzles 412.

The material liquid ejected from the ejection ports 418 of the electrospinning nozzles 412 moves along the in-plane direction of the principal surfaces of the substrate 8 while turning into the fibers 82, and is deposited onto the substrate 8. Namely, the material liquid is ejected in a direction parallel to the principal surfaces of the substrate and deposited as the fibers 82 on the substrate 8. The path of the material liquid/fibers 82, starting from ejection of the material liquid from the ejection port 418 of each of the electrospinning nozzles 412 to deposition of the material liquid as the fibers 82 on the substrate 8, may roughly be, for example, parallel or approximately parallel to the principal surfaces of the substrate 8. By ejecting the material liquid from the ejection ports 418 of the electrospinning nozzles 412 arranged so that the flow directions 419 of the flow paths 417 will be parallel to the side surfaces of the substrate 8, the ejection direction of the material liquid and the path of the material liquid/fibers 82 can be made parallel or approximately parallel to the principal surfaces of the substrate 8. Since the path of the material liquid is induced to follow a direction from the ejection port 418 toward the substrate 8 by the potential difference between the electrified material liquid and the substrate 8, the influence of gravity on the material liquid/fibers 82 can be ignored.

By virtue of the primer coating 81 formed by applying the primer solution 300 onto the principal surfaces of the substrate 8 at the first position 3a, the fibers 82 can be deposited onto both the front and back surfaces of the substrate 8 in a state suitable as the insulating fiber film 83, even with the material liquid being ejected in a direction along the principal surfaces of the substrate 3. Some of the fibers 82 pass beyond the areas of the principal surfaces of the substrate 8 and hang over to the outside of the side surface of the substrate 8 opposite to the side surface of the substrate 8 that faces the ejection port 418 (i.e., the opposite edge across the short-side direction of the substrate 8). With the principal surfaces of the substrate 8 coated with the primer coating 81, the amount of the fibers 82 hanging out can be suppressed, as compared to the case where no primer coating 81 is provided. Reducing the amount of the fibers 82 hanging out eliminates the need to remove the excess fibers 82, leading to improved productivity. With the primer coating 81 disposed on the principal surfaces of the substrate 8, more fibers 82 can be deposited onto the principal surfaces of the substrate 8, leading to improved material efficiency in the production.

The fibers 82 are also deposited onto the side surface of the substrate 8 that faces the ejection port 418 of the electrospinning nozzle 412 and corresponds to the edge surface on the long side of the belt-shape of the substrate 8. On the other hand, although the fibers 82 hang out on the long side opposite to the side surface facing the ejection port 418, as described above, the fibers 82 are hardly deposited on this opposite side surface itself. Namely, the side surface of the substrate 8 opposite to the side surface facing the ejection port 418 is located on a blind side to the ejection port 418.

In order to deposit the fibers 82 on the side surfaces along both of the long sides of the belt-shape of the substrate 8, the material liquid is preferably ejected toward the side surfaces on the long sides of the substrate 8 from both directions along the short-side direction of the substrate 8. Namely, it is preferable to arrange one or more electrospinning nozzles 412 so that the ejection port(s) 418 faces the side surface on one of the long sides of the substrate 8, while arranging another one or more electrospinning nozzles 412 so that the ejection port(s) 418 faces the side surface on the other of the long sides of the substrate 8, as in the example shown. However, caution should be taken so that the ejection ports 418 do not face each other (with the substrate 8 interposed therebetween) in order to avoid effects such as those due to interference between the electrospinning nozzles 412 to which a voltage of the same polarity has been applied. For example, the electrospinning nozzle(s) 412 on the side of one of the long sides of the substrate 8 and the electrospinning nozzle(s) 412 on the side of the other of the long sides are arranged in a staggered manner along the conveying path 100 of the substrate 8.

The controller 44 is, for example, a computer. The controller 44 includes a processor (including a central processing unit (CPU), an application specific integrated circuit (ASIC), a field programmable gate array (FPGA), etc.) or an integrated circuit (control circuit), and a storage medium such as a memory. The controller 44 may include only one integrated circuit or the like, or may include a plurality of integrated circuits or the like. The controller 44 executes a program or the like stored in the storage medium, etc., to perform processing. The controller 44 controls the driving of the material liquid supply drive 422, the operation of the material liquid supply adjuster 423, the output from the power supply 43, and the like.

Formation of the insulating fiber film 83 can be performed continuously along the longitudinal direction of the substrate 8 by ejecting the material liquid/fibers 82 toward the side surfaces of the substrate 8 while conveying the substrate 8 along the conveying path 100, as shown in FIG. 1. The formation need not be performed continuously, as described above. For example, the insulating fiber film 83 may be formed sequentially on the substrate 8 having a predetermined length in the longitudinal direction. In this case, the substrate 8 may be moved or the electrospinning equipment may be moved along the longitudinal direction of the substrate 8 in order to form the insulating fiber film 83 over the entire length of the substrate 8. In such a case, ejection of the material liquid from the electrospinning equipment whose ejection port(s) faces the side surface along one of the long sides of the substrate 8, and ejection of the material liquid from the electrospinning equipment whose ejection port(s) faces the side surface along the other of the long sides of the substrate 8, may be performed alternately.

With reference to FIG. 5, a method of forming the insulating fiber film 83 on the substrate 8 by the electrospinning method in batches will be described as an aspect different from the continuous roll-to-roll method shown in FIG. 1.

FIG. 5 is a perspective view schematically showing an aspect of forming an insulating fiber film in batches. An electrospinning device 40c for forming an insulating fiber film in batches includes a belt 48 for conveying a substrate 8 held by jigs 46 and electrospinning nozzles 412 configured to eject a material liquid toward the substrate 8. A conveying path of the belt 48 is defined by guide rollers 90 at the second position 4c. The belt 48 is conveyed by being driven by a motor (not shown). The jigs 46 with a base 45 are placed on the belt 48, and the substrate 8 is held by the jigs 46. The electrospinning nozzles 412 are arranged so that the ejection ports face the side surfaces along both of the long sides of the substrate 8 held by the jigs 46. A material liquid is supplied to the electrospinning nozzles 412; however, for sake of simplifying the drawing, illustration of a supply source of the material liquid is omitted. The power supply 43 is provided so as to be able to apply a voltage of one of the polarities to the electrospinning nozzles 412 and apply a voltage of the opposite polarity to the guide rollers 90.

The substrate 8 is cut into a predetermined length in the longitudinal direction of the strip shape, and may have, for example, a rectangular shape. The dimensions of the rectangular shape are adjusted in accordance with a desired size of a composite electrode, and may have, for example, a length of 16 cm to 24 cm in the long-side direction of the strip shape. The portions of the substrate 8 held by the jigs 46 are masked by the jigs 46, so that the fibers 82 are not deposited on these portions. Thus, the portions of the substrate 8 held by the jigs 46 will be cut off in the production of a composite electrode. For this reason, the length of the substrate 8 in the long-side direction is preferably set larger than a desired length of the long sides of an electrode foil of a composite electrode.

In the example shown in the figure, the jigs 46 have a structure capable of opening and closing about a hinge 47, and thereby have a mechanism of holding the substrate 8. The structure of the jigs 46 is not limited to the example shown in the figure, but may be one having, for example, a chuck for holding the substrate 8. The jigs 46 preferably have a structure that can hold the substrate 8 in a strained state so that an appropriate amount of tension is applied to the substrate 8 to prevent the substrate 8 from sagging.

A material liquid is electrified by applying voltages to the electrospinning nozzles 412 using the power supply 43. In the example shown in FIG. 5, voltages of a polarity opposite to that of the voltages applied to the electrospinning nozzles 412 are applied to the electrically conductive guide rollers 90 by the power supply 43. The belt 48, the base 45, and the jigs 46 are also made of an electrically conductive material, and voltages of a polarity opposite to that of the voltages applied to the electrospinning nozzles 412 are applied indirectly to the substrate 8. The guide rollers 90 may be grounded.

In the same manner as described above, the potential difference between the electrified material liquid and the substrate 8 causes the material liquid to be ejected from the electrospinning nozzles 412 toward the side surfaces of the substrate 8, whereby the fibers 82 are deposited onto the surface of the substrate 8 coated with the primer solution and insulating fiber films are formed.

The jigs 46 provided with the base 45, holding the substrate 8, and placed on the belt 48 moves in tandem with the conveyance of the belt 48. Namely, the example shown in the figure corresponds to an aspect in which the substrate 8 is movable. Instead of moving the substrate 8, the electrospinning nozzles 412 may be moved along the long-side direction of the substrate 8.

By shifting the positional relationship between the substrate 8 and the electrospinning nozzles 412 along the longitudinal direction of the substrate 8, insulating fiber films can be formed over the entire length in the longitudinal direction of the substrate 8. The material liquid may be ejected simultaneously from the electrospinning nozzles 412 arranged on both sides of the substrate 8, or ejected alternately from the respective electrospinning nozzles 412. However, caution should be taken so that the ejection ports of the electrospinning nozzles 412 do not face each other with the substrate 8 interposed therebetween. In addition, in view of the material efficiency, it is preferable to pause the ejection from electrospinning nozzles 412 in a state where the ejection port does not face the side surface of the substrate 8.

Alternatively, a plurality of electrospinning nozzles 412 may be arranged so as to correspond to the entire length direction of the substrate 8, to form insulating fiber films by ejecting the material liquid without moving either the substrate 8 or the electrospinning nozzles 412. In this case, for example, the ejection of the material liquid from the electrospinning nozzles 412 arranged on one of the long sides of the substrate 8 and the ejection of the material liquid from the electrospinning nozzles 412 arranged on the other of the long sides of the substrate B may be performed alternately, whereby interference between the electrospinning nozzles 412 to which voltages of the same polarity have been applied can be avoided.

The application of the primer solution 300 at the first position 3a (or the first position 3b) may also be performed with the substrate 8 held by the jigs 46. The drying at a third position 5 downstream may also be performed with the substrate 8 held by the jigs 46. The substrate 8 may be conveyed from the first position 3a to the second position 4c, and from the second position 4c to the third position 5 while being held by the jigs 46.

In this manner, the formation of the insulating fiber films through deposition of the fibers 82 on the substrate 8 may be performed in batches per unit of the rectangular shape of the substrate 8 cut into a predetermined length.

As described above, a composite electrode 18 can be produced by applying the primer solution onto the substrate 8 and ejecting the material liquid toward the side surfaces of the substrate 8 to deposit the insulating fiber films on the principal surfaces of the substrate 8 by the electrospinning method. FIG. 1 shows a preferred aspect in which drying and pressing are performed at the third position 5 and a fourth position 6 on the downstream side of the second position 4a on the conveying path 100 of the substrate 8.

In the manufacturing apparatus 1 of the preferred aspect in which drying is performed, the drying furnace 50 is arranged at the third position 5 downstream relative to the second position 4a. The substrate 8 with the insulating fiber films 83 formed thereon is conveyed from the electrospinning device 40a to the drying furnace 50. The drying furnace 50 dries the primer coating 81 that coats the surface of the substrate 8 passing through the interior of the drying furnace 50 and the insulating fiber films 83 formed on the surfaces of the substrate B. The drying operation will be described in detail with reference to FIG. 6.

FIG. 6 is a sectional view schematically showing drying of the substrate 8 having the primer coating 81 and insulating fiber films 83 formed thereon. The drying oven 50 located in the third position 5 may include, for example, an infrared heater 51. The infrared heater 51 generates infrared light. The infrared heater 51 emits the generated infrared light onto the insulating fiber films 83 formed on the surfaces of the substrate 8. Functional groups included in the organic material, solvent, and the like in the primer solution forming the primer coating 81 and the insulating fiber films 83 absorbs the infrared light emitted from the infrared heater 51, whereby the primer coating 81 and the insulating fiber films 83 are heated, and the solvent included in the primer solution forming the primer coating 81 and the insulating fiber films 83 evaporate. Thereby, the amount of solvent included in the insulating fiber films 83 diminishes while the primer coating 81 becomes removed, whereby the substrate 8 and the insulating fiber films 83 are dried.

Here, the infrared heater 51 preferably emits infrared light having a wavelength corresponding to a maximum radiation intensity of 10 µm or less onto the primer coating 81 and insulating fiber films 83. In this case, in a state of emitting the infrared light, the temperature of the infrared heater 51 is 17° C. (290 K) or more. Here, among the functional groups included in the organic material, solvent, and the like in the insulating fiber films 83, many easily absorb infrared light having a wavelength of 10 µm or less. Therefore, by emitting infrared light with a spectrum in which a wavelength corresponding to a maximum radiation intensity is 10 µm or less, functional groups included in the organic material, solvent, and the like in the insulating fiber films 83 more easily absorb the emitted infrared light, and the solvent included in the insulating fiber films 83 more readily evaporate by heating. Thereby, drying of the insulating fiber films 83 is performed more appropriately. Among those included in the solvent of the insulating fiber films 83, examples of functional groups that easily absorb infrared light having a wavelength of 10 µm or less include a methyl group and a carbonyl group.

In addition, in a spectrum of infrared light emitted from the infrared heater 51, the wavelength corresponding to the maximum radiation intensity is more preferably 4 µm to 7 µm. By setting the wavelength corresponding to the maximum radiation intensity in the spectrum of the emitted infrared light to be 7 µm or less, the temperature of the infrared heater 51 becomes 137° C. (410 K) or more in a state of emitting the infrared light. Thus, by emitting infrared light having a spectrum in which a wavelength corresponding to a maximum radiation intensity is 7 µm or less, an organic solvent and the like having a boiling point of 100° C. or more also becomes easy to evaporate, and the solvent included in the primer solution forming the primer coating 81 and insulating fiber films 83 evaporates more appropriately. In addition, by setting the wavelength corresponding to the maximum radiation intensity in the spectrum of the emitted infrared light to be 4 µm or more, the temperature of the infrared heater 51 becomes 451° C. (724 K) or less in the state of emitting the infrared light. This effectively prevents an excessive increase in temperature in the space within which the substrate 8 and insulating fiber films 83 are dried, in the state of emitting the infrared light.

The drying of the substrate 8 and insulating fiber films 83 in the drying oven 50 is not limited to drying with infrared light emitted from the infrared heater 51. In one example, in the drying oven 50, the substrate 8 and insulating fiber films 83 may be dried by blowing hot air instead of the infrared light emitted from the infrared heater 51.

By diminishing the solvent included in the insulating fiber films 83 by drying in the drying oven 50, the amount of solvent included in the insulating fiber films 83 is kept low in the composite oxide manufactured by the manufacturing apparatus 1. Thereby, durability of the insulating fiber films 83 of the manufactured composite electrode is ensured while the performance of a product using the composite oxide is ensured.

For example, in a condenser using the composite oxide manufactured by the manufacturing method and manufacturing apparatus according to the embodiment, the amount of solvent included in the insulating fiber films 83 functioning as separators is kept low, whereby the durability of the insulating fiber films 83 improves while the durability of the condenser improves. In addition, with the amount of solvent included in the insulating fiber films 83 kept low, internal resistance of the condenser is kept low, making it possible to achieve high condenser output. Thereby, performance of the condenser is ensured.

The press 60 is arranged at the fourth position 6 downstream relative to the third position 5. The press 60 includes a pair of press rollers 61. The press 60 is configured to press the insulating fiber films 83 formed on the surfaces of the substrate 8. The insulating fiber films 83 are rolled (pressed) by the press and thereby compressed, so that density and strength of the insulating fiber films 83 can be enhanced. The press operation will be described in detail with reference to FIG. 7.

Figure 7:
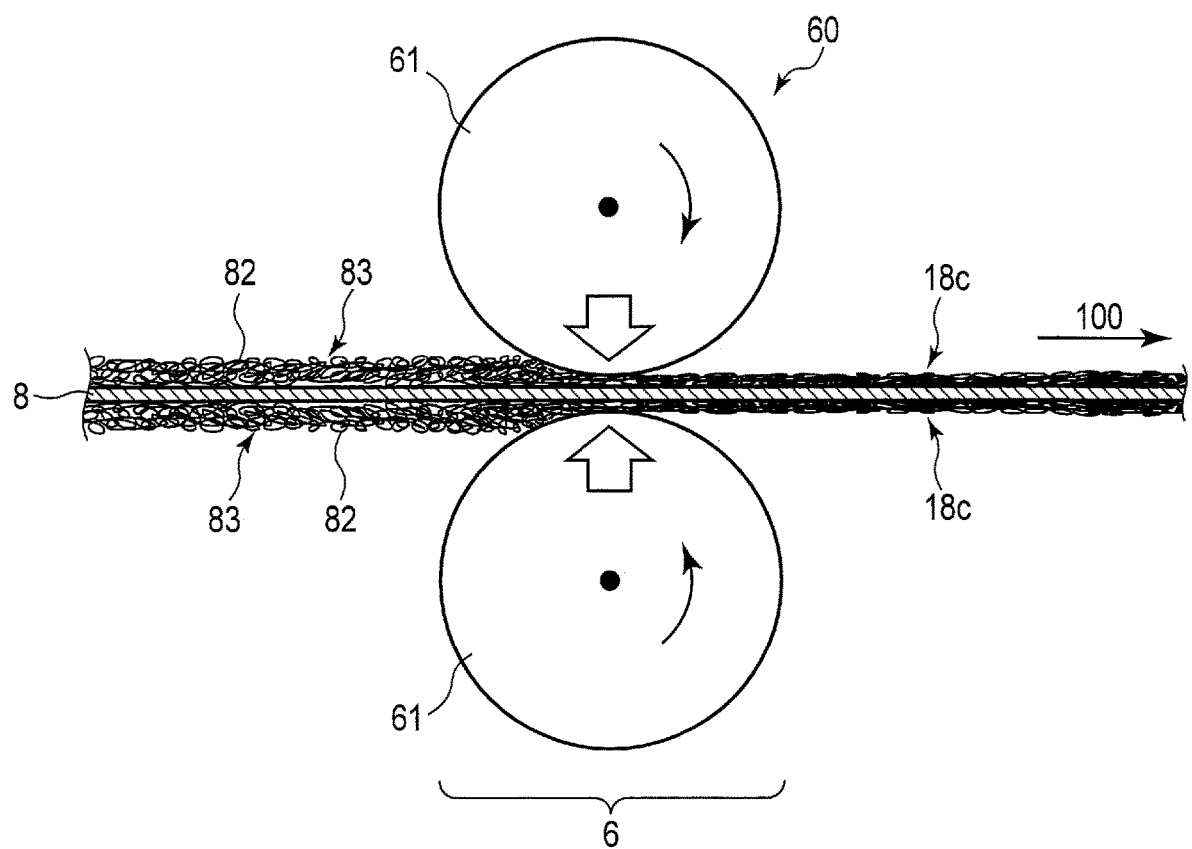
FIG. 7 is a schematic sectional view showing an example of pressing that may be included in the method for manufacturing a composite electrode according to the embodiment.

FIG. 7 is a schematic sectional view showing an example of the press that may be provided to the manufacturing apparatus 1. The press 60 at the fourth position 6 on the conveying path 100 of the substrate 8 includes the pair of press rollers 61. The pair of press rollers 61 are driven by an electric motor or the like, for example. The substrate 8 with the insulating fiber films 83 formed on its surfaces is conveyed along the conveying path 100 and inserted between the pair of press rollers 61. At this time, one of the press rollers 61 presses the insulating fiber film 83 and the substrate 8 from one side in the thickness direction of the substrate 8, and the other of the press rollers 61 presses the insulating fiber film 83 and the substrate 8 from the other side in the thickness direction of the substrate 8. An adjustment may be made as appropriate by the press operation in order to obtain an insulating fiber film 18c having a desired density and thickness as a separator of the composite electrode.

In the manufacturing apparatus 1, the press 60 preferably presses the insulating fiber films 83 formed on the surfaces of the substrate 8 at least before the substrate 8 is rolled up by the roll-up device 70. In the manufacturing apparatus 1, the press 60 is preferably arranged further downstream than the drying furnace 50 on the conveying path 100 of the substrate 8. By removing the primer solution 300 by drying before the pressing is performed with the press 60, contamination of the press rollers 61 of the press 60 can be avoided. This allows for reduction of the frequency of washing the press rollers 61 or omission of the washing treatment. Moreover, performing drying before pressing can evaporate the primer solution 300 or a solvent of the material liquid more reliably.

In the method of manufacturing a composite electrode according to the embodiment described above, the amount of fibers that hang out from the areas of the principal surfaces of the substrate when a substrate with a narrow width is used, can be reduced even when the electrospinning method is adopted. A description will be given with reference to FIGS. 8 and 9.

Figure 8:
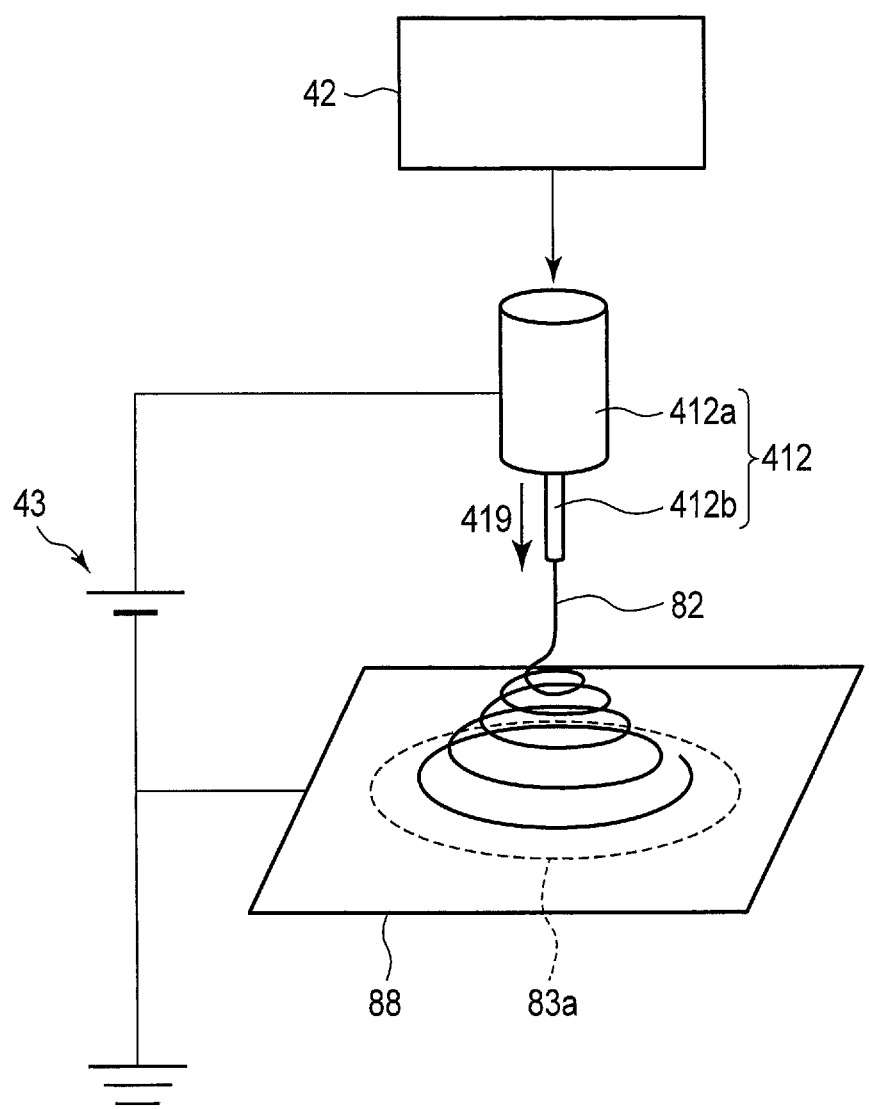
FIG. 8 is a perspective view for schematically explaining conventional spreading of fibers that occurs when a material liquid is ejected by an electrospinning method.
Figure 9:
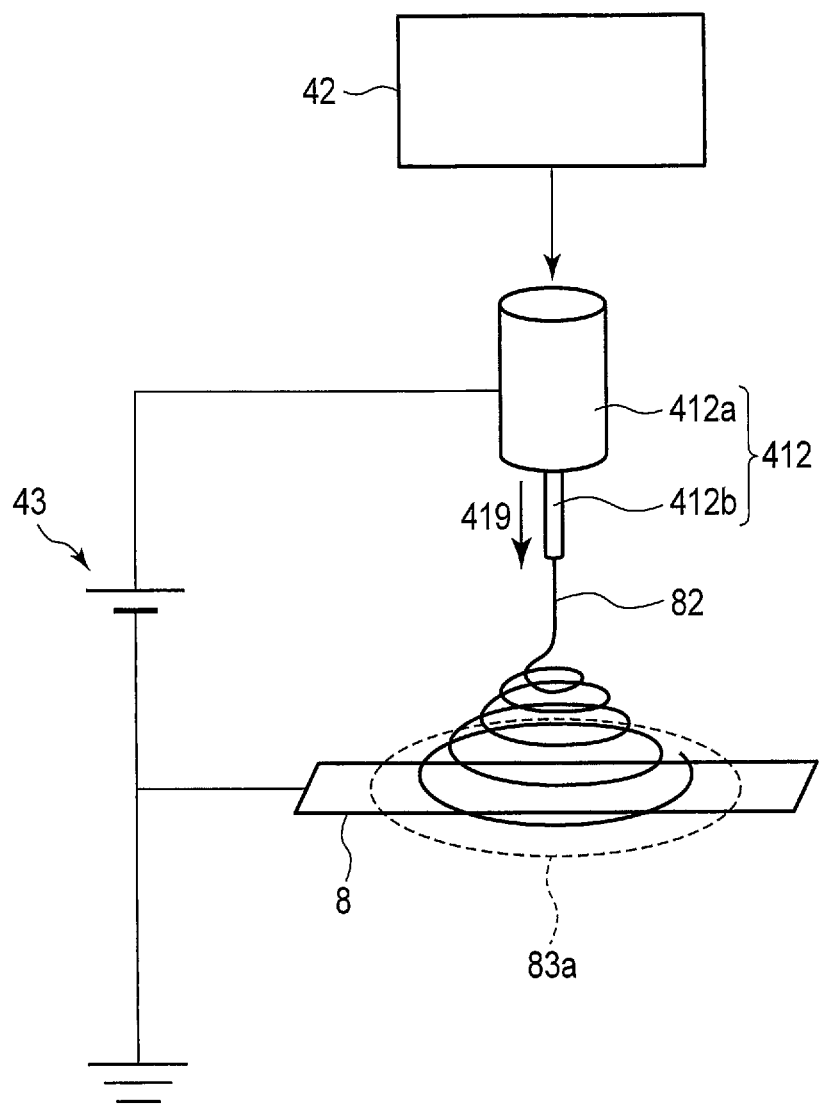
FIG. 9 is a perspective view for schematically explaining conventional spreading of fibers occurring when a material liquid is ejected by an electrospinning method.

FIGS. 8 and 9 respectively provide schematic illustration of spreading of fibers that occurs when a material liquid is ejected by the conventional electrospinning method. FIGS. 8 and 9 respectively show the following: the power supply 43 applies a voltage between substrates 88 and 8 and electrospinning nozzles 412 provided with a nozzle base 412a and a needle part 412b and having a flow path (not shown) whose flow direction 419 intersects (e.g., perpendicularly or approximately perpendicularly) with the substrate 88 or substrate 8; the material liquid is supplied from the material liquid supply source 42 to the electrospinning nozzles 412 and electrified; the electrified material liquid is ejected from the electrospinning nozzles 412 toward the principal surfaces of the substrates 88 and 8; and the material liquid is deposited as the fibers 82 on the substrates 88 and 8. When depositing the fibers 82 on the principal surfaces of the substrates 88 and 8 in a uniform distribution, the spreading diameter 83a of the fibers 82 will typically be approximately from 920 mm to 40 mm. On one hand, when the substrate 88 has a rectangular principal surface with each side having a width of 50 mm or more, as in the example shown in FIG. 8, the fibers 82 can be deposited without falling outside the substrate 88. On the other hand, when the principal surfaces of the substrate 8 have a small short-side width and the fibers 82 ejected toward the principal surfaces of the substrate 8 have a spreading diameter 83a exceeding the short-side width of the principal surfaces, as in the example shown in FIG. 9, part of the fibers 82 fall outside the areas of the principal surfaces of the substrate 8. To give a specific example, when the spreading diameter 83a of the fibers 82 is φ20 mm or more while the substrate 8 has a short-side width of 6 mm or less, a total of 14 mm or more of the fibers 82 hang out in the short side direction of the substrate 8. This leads not only to the necessity of adding the process of removing the excess fibers 82 to the manufacturing process but also to low material efficiency of the material liquid of the fibers 82.

Figure 10:
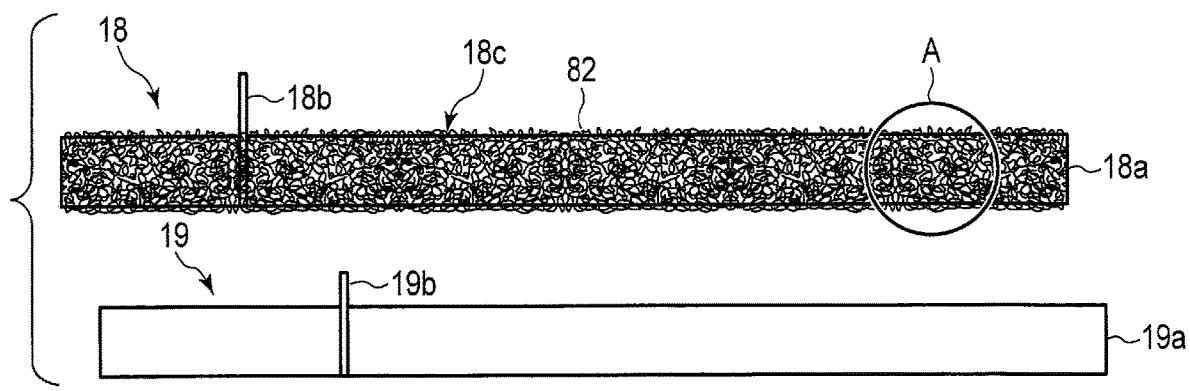
FIG. 10 is a plan view schematically showing an example of the components of an electrolytic capacitor main body adopting the composite electrode manufactured by the method according to the embodiment.
Figure 11:
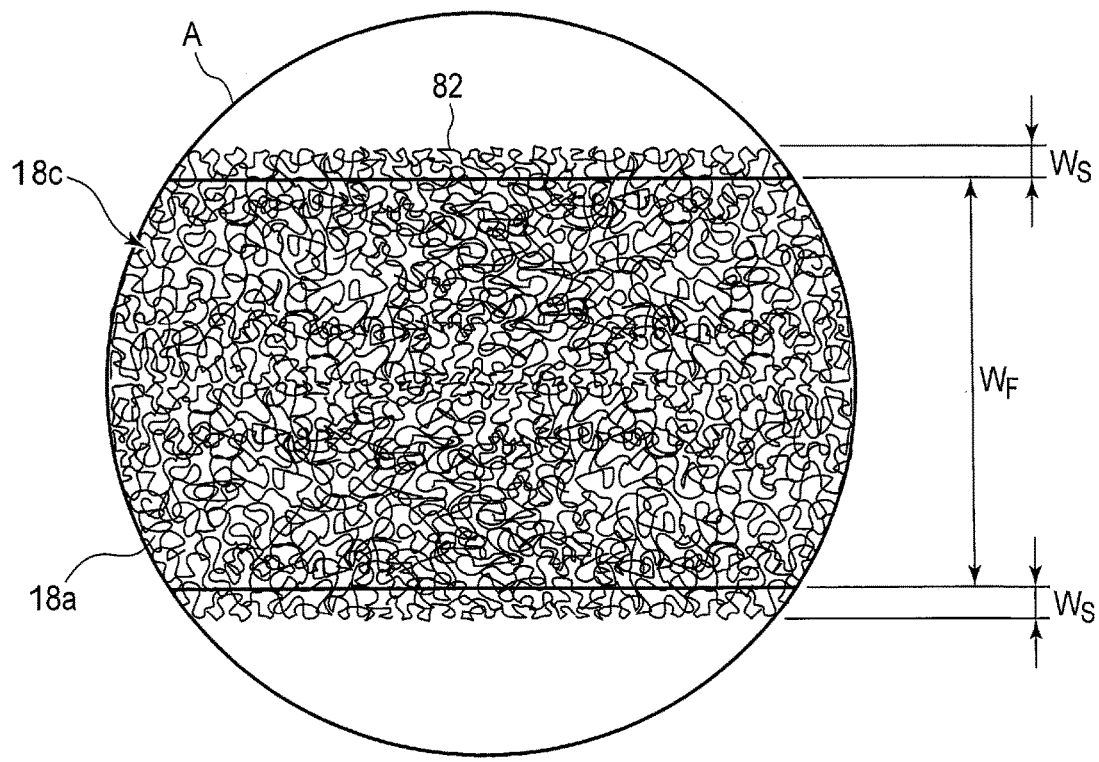
FIG. 11 is an enlarged view of section A shown in FIG. 10.

In the manufacturing method and the manufacturing apparatus according to the embodiments, when depositing the fibers 82 made of a material liquid onto the surface of the substrate 8 by the electrospinning method, a primer treatment where the primer solution 300 is applied onto the surface of the substrate 8 is performed in advance, and the material liquid is ejected, not from the direction intersecting with the principal surfaces of the substrate 8, but from the direction parallel or approximately parallel to the principal surfaces toward the side surfaces of the substrate 8, to deposit the fibers 82 onto the principal surfaces and the side surfaces of the substrate 8. This method allows for efficient deposition of the fibers 82 onto the surfaces of the substrate 8 and reduction of the amount of the fibers 82 hanging out from the areas of the principal surfaces of the substrate 8. FIGS. 10 and 11 show an example of a composite electrode obtained by the manufacturing method and the manufacturing apparatus according to the embodiments.

FIG. 10 is a plan view schematically showing an example of the aforementioned composite electrode obtained by the manufacturing method and the manufacturing apparatus according to the embodiments and an example of a counter electrode thereto. A composite electrode 18 includes an electrode foil 18a, an electrode terminal 18b, and an insulating fiber film 18c made of fibers 82 and functioning as a separator. The composite electrode 18 has a configuration where the electrode (electrode foil 18a) and the separator (insulating fiber film 18c) are integrated with each other. A counter electrode 19 includes a counter electrode foil 19a and a counter electrode terminal 19b. The counter electrode 19 is a counter electrode with respect to the composite electrode 18. The composite electrode 18 may be a composite anode formed of an anode and a separator that are integrated with each other, and the counter electrode 19 may be a cathode. Alternatively, the composite electrode 18 may be a composite cathode formed of a cathode and a separator that are integrated with each other, and the counter electrode 19 may be an anode. The example shown in the figures is the former combination of electrodes. In typical specifications, a cathode terminal (counter electrode terminal 19b) is shorter than an anode terminal (electrode terminal 18b) so that they are visibly distinguishable from each other.

The composite electrode 18 is suitably used as a composite electrode (composite anode or composite cathode) for an electrolytic capacitor. The counter electrode 19 may be an electrode (cathode or anode) for an electrolytic capacitor.

The electrode foil 18a and the counter electrode foil 19a have a belt shape. The electrode foil 18a and the counter electrode foil 19a are preferably electrically conductive foils. The electrode foil 18a and the counter electrode foil 19a are more preferably electrically conductive foils with an oxide coating, which functions as a dielectric layer, chemically formed on the surface thereof. In one example, the respective foils are aluminum foils coated with an aluminum-oxide coating. The electrode foil 18a is the substrate 8 described with reference to FIG. 1 etc., and supports on its surfaces, for example, the insulating fiber films 18c that has been formed by accumulating the fibers 82 at the second position 4a, performing drying at the third position 5, and performing pressing at the fourth position 6.

For example, the electrode terminal 18b and the counter electrode terminal 19b may have a rod shape. The electrode terminal 18b and the counter electrode terminal 19b are electrically connected to the electrode foil 18a and the counter electrode foil 19a, respectively. Each of the terminals may be electrically connected to its corresponding foil by, for example, being fixed thereto by swaging. The orientation of the long side of the rod-shape of each terminal conforms to, for example, the short-side direction of the belt shape of the corresponding foil. Each of the rod-shaped terminals is, for example, located so that one of the ends thereof is aligned with one of the long sides of the belt shape of the corresponding foil, and the other of the ends thereof sticks out from the other of the long sides of the belt shape of the corresponding foil. The electrode terminal 18b may be partially coated with the insulating fiber film 18c.

FIG. 11 is an enlarged view of a part of the composite electrode 18 shown in FIG. 10 (i.e. an enlarged view of the section A shown in FIG. 10). A short-side width $W_F$ of the electrode foil 18a is within the range of 2 mm to 6 mm. The range that the insulating fiber film 18c spans in the short-side direction of the composite electrode 18 hangs out beyond the short-side width $W_F$ on both of the long sides of the electrode foil 18a by an overhanging width $W_S$, respectively. The overhanging width $W_S$ is kept to 0.2 mm or less along both of the long sides of the electrode foil 18a. By manufacturing the composite electrode 18 with the manufacturing method and the manufacturing apparatus according to the embodiments, the overhanging width $W_S$ can be kept to 0.2 mm or less. A larger overhanging width $W_S$ makes it possible to more reliably fulfill the function of the insulating fiber film 18c as a separator that electrically insulates the composite electrode 18 from the counter electrode 19. However, from the standpoint of increasing the electrostatic capacitance of the capacitor per volume, the overhanging width $W_S$ on both sides is preferably kept to 0.2 mm or less. The overhanging width $W_S$ may also be 0.1 mm or less, and may specifically be, for example, 0.06 mm.

Before forming the insulating fiber film 18c (insulating fiber film 83) on the surface of the electrode foil 18a, the electrode terminal 18b is preferably fixed onto the substrate 8 (electrode foil 18a) by swaging in advance. Namely, it is preferable to fix the electrode terminal 18b onto the substrate 8 by swaging prior to an application of the primer solution 300 onto the substrate 8. By fixing the electrode terminal 18b onto the substrate 8 by swaging before forming the insulating fiber film 18c, it is possible to omit the operation of partially removing the insulating fiber film 18c generated when the electrode terminal 18b is electrically connected to the substrate 8 (electrode foil 18a) afterwards. It is also possible to avoid loss of the function of the insulating fiber film 18 as a separator due to the insulating fiber film 18c falling off when the electrode terminal 18b is fixed by swaging afterwards. Additionally, since the surface of the electrode terminal 18b can also be partially coated with the insulating fiber film 18c, a short circuit via the electrode terminal 18b can be prevented from occurring. With regard to a portion of the electrode terminal 18b that is desirably not coated with the insulating fiber film 18c, for example, an excess part of the insulating fiber film 18c may be removed afterwards, or a portion of the electrode terminal 18b that is not to be coated may be masked.

The counter electrode foil 19a of the counter electrode 19 may have dimensions comparable to those of the electrode foil 18a of the composite electrode 18.

Figure 12:
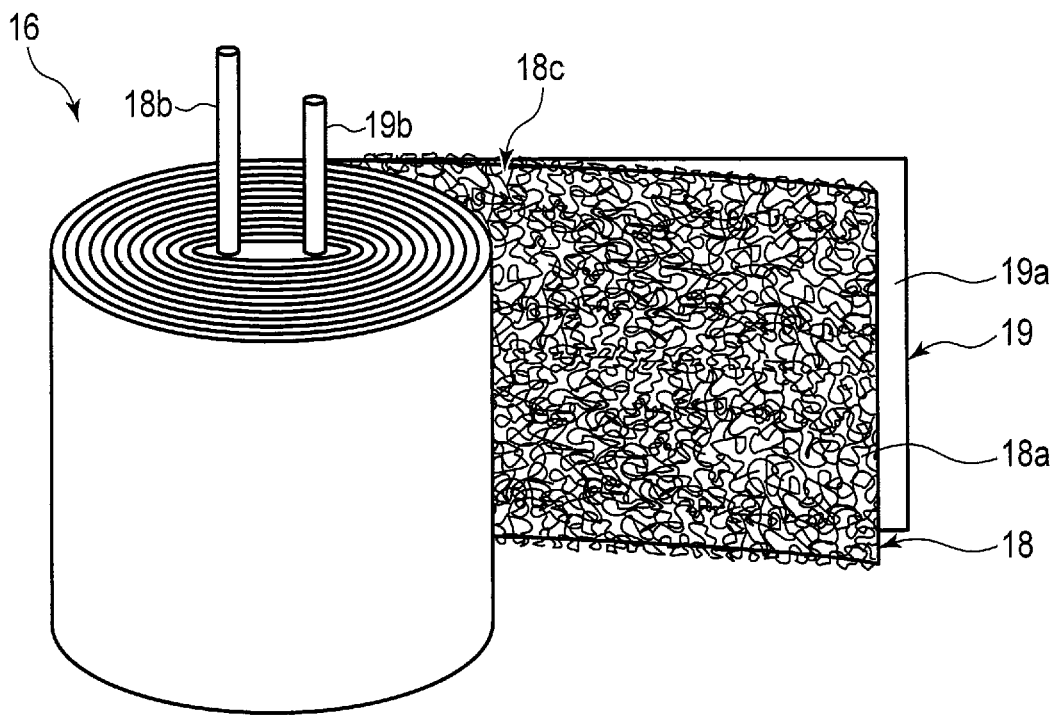
FIG. 12 is a partially unwound perspective view schematically showing an example of an electrolytic capacitor main body adopting the composite electrode manufactured by the method according to the embodiment.
Figure 13:
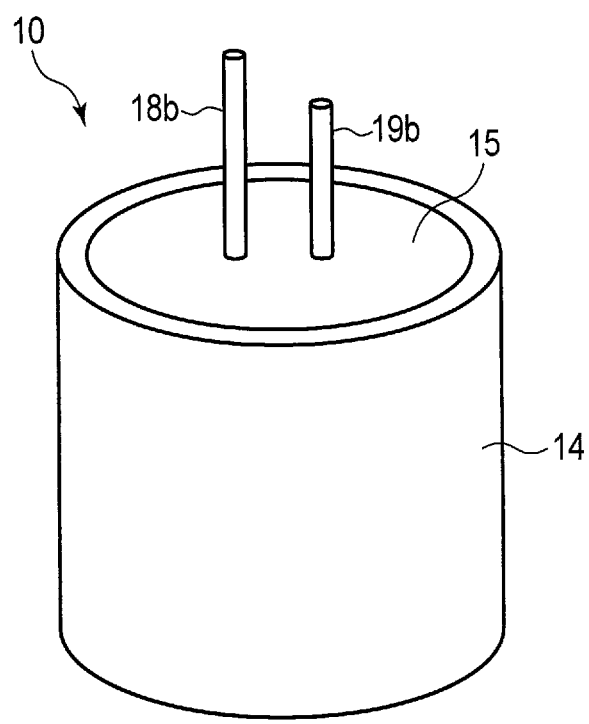
FIG. 13 is a perspective view schematically showing an example of an electrolytic capacitor adopting the composite electrode manufactured by the method according to the embodiment.

An electrolytic capacitor main body as a main component of an electrolytic capacitor can be produced using the composite electrode 18 and the counter electrode 19. FIGS. 12 and 13 show an electrolytic capacitor main body and an electrolytic capacitor, respectively.

FIG. 12 is a partially unwound perspective view schematically showing an electrolytic capacitor main body adopting the composite electrode 18 and the counter electrode 19. FIG. 13 is a perspective view schematically showing an electrolytic capacitor adopting the electrolytic capacitor main body shown in FIG. 12.

An electrolytic capacitor main body 16 shown in FIG. 12 includes the composite electrode 18 and the counter electrode 19 described above. The electrolytic capacitor main body 16 is made by stacking the composite electrode 18 and the counter electrode 19 so that ends of the electrode terminal 18b and the counter electrode terminal 19b sticking out beyond the electrode foil 18a and the counter electrode foil 19a, respectively, are aligned in the same direction, and winding the stack of the composite electrode 18 and the counter electrode 19 so that the electrode terminal 18b and the counter electrode terminal 19b extend out from the wound end surface.

An electrolytic capacitor 10 shown in FIG. 13 includes the electrolytic capacitor main body (not shown), a case 14, and a sealing member 15. The electrolytic capacitor 10 is formed by housing the electrolytic capacitor main body 16 in the case 14, and closing the opening of the case 14 with the sealing member 15 in such a manner that the electrode terminal 18b and the counter electrode terminal 19b are exposed to the outside. The electrolytic capacitor 10 may further include an electrolytic solution (not shown) in the case 14. For example, the insulating fiber film 18c may be impregnated with the electrolytic solution.

The electrolytic capacitor 10 may be, for example, an aluminum electrolytic capacitor. In the case of such an electrolytic capacitor 10, the electrode foil 18a is an aluminum foil coated with an aluminum-oxide coating.

The electrolytic capacitor 10 includes, as an anode or a cathode, the composite electrode 18 manufactured with the manufacturing method or the manufacturing apparatus according to the embodiment. Therefore, the electrostatic capacitance per volume is large. The reason therefor will be explained below.

Figure 14:
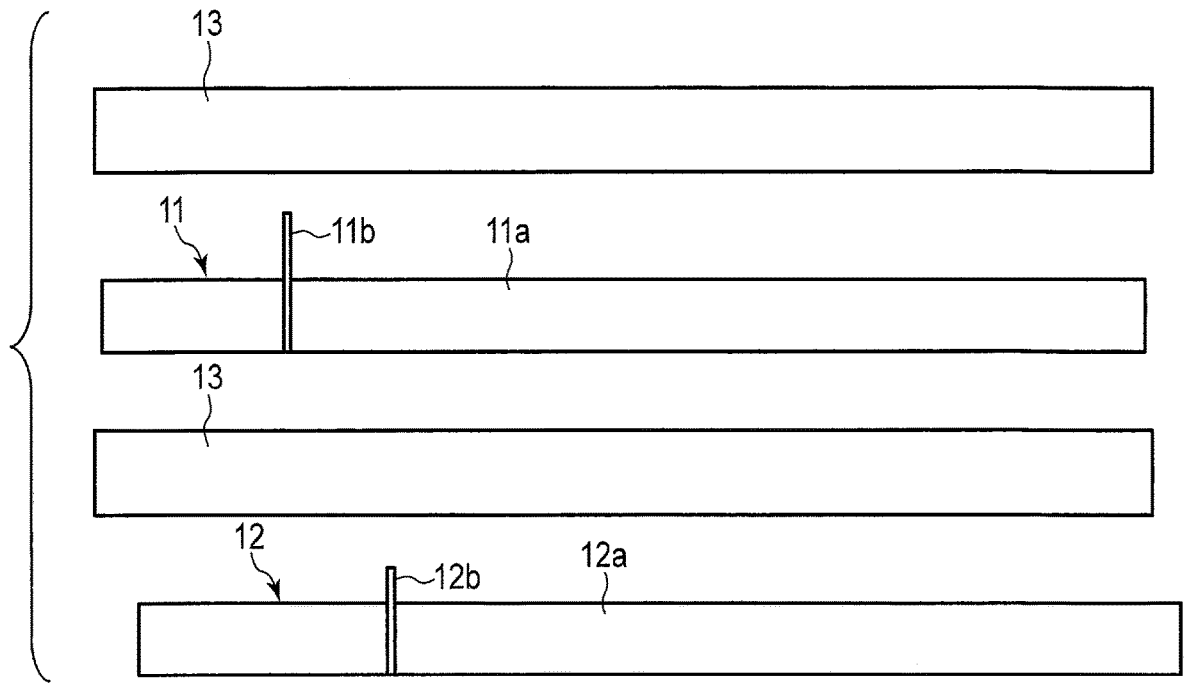
FIG. 14 is a plan view schematically showing an example of the components of a conventional electrolytic capacitor main body.
Figure 15:
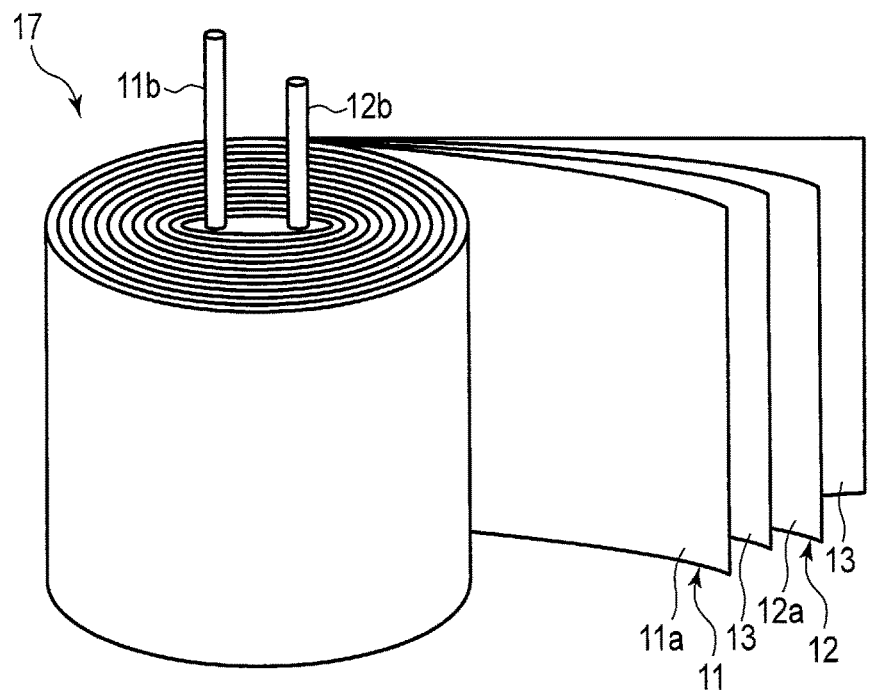
FIG. 15 is a partially unwound perspective view schematically showing an example of a conventional electrolytic capacitor main body.

FIGS. 14 and 15 show components of a conventional electrolytic capacitor. FIG. 14 is a plan view schematically showing an example of electrodes and separators included in a conventional electrolytic capacitor. FIG. 15 is a perspective view schematically showing an electrolytic capacitor main body obtained using the electrodes and the separators shown in FIG. 14.

An anode 11 includes a belt-shaped anode foil 11a and an anode terminal 11b. A cathode 12 includes a belt-shaped cathode foil 12a and a cathode terminal 12b. The cathode 12 is a counter electrode with respect to the anode 11. The anode 11 and the cathode 12 may have the same configuration as that of the composite electrode 18 shown in FIG. 10 except for having no insulating fiber film, or the same configuration as that of the counter electrode 19 shown in FIG. 10.

The separators 13 are members exhibiting electrically insulating properties, such as insulating paper. The separators 13 may have a belt shape with dimensions comparable to or somewhat larger than those of the anode 11 and the cathode 12.

An electrolytic capacitor main body 17 is made by stacking the anode 11, one separator 13, the cathode 12, and another separator 13 in this order and winding the obtained stack so that an anode terminal 11b and a cathode terminal 12b extend out from the wound end surface.

FIGS. 14 and 15 show an example of the electrolytic capacitor main body 17 employing two separators 13 each having a longitudinal length comparable to that of the anode 11 and the cathode 12; however, electrolytic capacitor main bodies having various other configurations have also been put to practical use.

In the electrolytic capacitor main body 16 obtained by the manufacturing method and the manufacturing apparatus according to the embodiments, the insulating fiber film 18c is formed directly on the electrode foil 18a instead of separately stacking the separators 13 with the electrodes, unlike the conventional electrolytic capacitor main body 17 employing the separators 13 made of insulating paper or the like distinct from the electrode. The insulating fiber film 18c can be formed thin without impairing its function as a separator. Therefore, the electrolytic capacitor main body 16 adopting the composite electrode 18 can reduce the volume of the electrolytic capacitor while maintaining the same electrostatic capacitance as that of the conventional electrolytic capacitor main body 17. Alternatively, the electrolytic capacitor main body 16 adopting the composite electrode 18 can improve the electrostatic capacitance of the electrolytic capacitor while being kept to the same volume as that of the conventional electrolytic capacitor main body 17. A reduction in the amount that the insulating fiber film 18c hangs out from the areas of the principal surfaces of the electrode foil 18a in the composite electrode 18 manufactured by the manufacturing method and the manufacturing apparatus according to the embodiments, also contributes to such improvement of the electrostatic capacitance per volume.

In addition, since the number of components used to produce the electrolytic capacitor main body 16 adopting the composite electrode 18 is small, as compared to the case of producing the electrolytic capacitor main body 17 employing the independent separators 13 in addition to the electrodes, the frequency of generation of a defective product can be suppressed, and a yield in the manufacture can be improved.

According to one or more embodiment described above, a method for manufacturing a composite oxide and an apparatus for manufacturing a composite oxide are provided. The composite oxide manufactured by the manufacturing method and manufacturing apparatus includes a substrate having a belt shape and an insulating fiber film disposed thereon. The manufacturing method includes applying a primer solution onto the substrate, and ejecting an electrified material liquid in a direction parallel to principal surfaces of the substrate intersecting with side surfaces of the substrate to deposit the electrified material liquid onto the substrate, thereby forming the insulating fiber film on the principal surfaces of the substrate. The manufacturing apparatus includes a conveyer configured to convey the substrate along a conveying path, an applier configured to apply a primer solution onto the substrate at a first position on the conveying path, and an electrospinning equipment disposed at a second position downstream from the first position on the conveying path in such a manner that a flow direction of a flow path communicating with an ejection port configured to eject a material liquid is parallel to principal surfaces of the substrate intersecting with side surfaces thereof. According to the above manufacturing method and manufacturing apparatus, the above composite electrode can be manufactured with high productivity and material efficiency.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A method of manufacturing a composite electrode comprising:
a substrate having a belt shape; and
an insulating fiber film disposed on the substrate,
the method comprising:
applying a primer solution onto the substrate; and
ejecting an electrified material liquid in a direction parallel to principal surfaces of the substrate intersecting with side surfaces of the substrate to deposit the electrified material liquid onto the substrate to form the insulating fiber film on the principal surfaces of the substrate.

2. The method according to claim 1, wherein a short-side width of the belt shape of the substrate is from 2 mm to 6 mm.

3. The method according to claim 1, wherein the primer solution comprises at least one selected from the group consisting of ethylene glycol and γ-butyrolactone.

4. The method according to claim 1, wherein the applying the primer solution onto the substrate is performed by a dip method.

5. The method according to claim 1, wherein the applying the primer solution onto the substrate is performed by a spray method.

6. The method according to claim 1, wherein the belt shape of the substrate has a rectangular shape, and the ejecting the electrified material liquid in the direction parallel to the principal surfaces of the substrate to deposit the electrified material liquid onto the substrate to form the insulating fiber film on the principal surfaces of the substrate is performed in batches per unit of the rectangular shape.

7. The method according to claim 1, further comprising fixing an electrode terminal onto the substrate by swaging in advance of applying the primer solution onto the substrate.

8. An apparatus for manufacturing a composite electrode, the apparatus comprising:
a conveyer configured to convey a substrate having a belt shape along a conveying path;
an applier configured to apply a primer solution onto the substrate at a first position on the conveying path; and
an electrospinning equipment disposed at a second position on the conveying path downstream relative to the first position so that a flow direction of a flow path communicating with an ejection port configured to eject a material liquid is parallel to principal surfaces of the substrate intersecting with side surfaces of the substrate.

9. The apparatus according to claim 8, further comprising a drying furnace through which the substrate passes through, the drying furnace being arranged at a third position on the conveying path downstream relative to the second position.

10. The apparatus according to claim 9, further comprising a press configured to press an insulating fiber film disposed on the substrate, the press being arranged at a fourth position on the conveying path downstream relative to the third position.

11. The apparatus according to claim 8, wherein the applier comprises a sprayer configure to spray the primer solution toward the substrate.

* * * * *